United States Patent

Kitchener et al.

[15] 3,696,942

[45] Oct. 10, 1972

[54] MEANS FOR TRANSFERRING SUCCESSIVE FLEXIBLE WORK PIECES

[72] Inventors: Charles J. Kitchener; Paul G. Rumball, both of Beverly, Mass.

[73] Assignee: USM Corporation, Boston, Mass.

[22] Filed: Sept. 30, 1970

[21] Appl. No.: 77,177

[52] U.S. Cl. ............... 214/1 BB, 214/1 BD, 294/64, 294/103
[51] Int. Cl. ............................................. B66c 1/02
[58] Field of Search ...... 214/1 BT, 1 BH, 1 BV, 1 BS, 214/1 BB, 1 BD; 294/64 A, 64 B, 64 R, 103

[56] References Cited

FOREIGN PATENTS OR APPLICATIONS 209,294  11/1966  Sweden ...................... 294/64

Primary Examiner—Gerald M. Forlenza
Assistant Examiner—George F. Abraham
Attorney—Richard A. Wise, Richard B. Megley and Carl E. Johnson

[57] ABSTRACT

A device is powered for movement heightwise and laterally of a pile of work pieces, for instance articles of fabric or the like, and includes fluid pressure operated jaws for seizing and releasing successive single work pieces. The jaws are operative adjacent to a suctional opening in a work transferring member that contains a fluidically controlled circuit responsive to the change in pressure in the member, when its opening is restricted by a work piece, to effect closure of the jaws thereon. Arrival of the member with its clamped work piece at the release position causes the circuit to release the work piece.

8 Claims, 2 Drawing Figures

PATENTED OCT 10 1972 3,696,942

Inventors
Charles J. Kitchener
Paul G. Rumball
By their Attorney
Carl F. Johnson

MEANS FOR TRANSFERRING SUCCESSIVE FLEXIBLE WORK PIECES

CROSS REFERENCE TO RELATED APPLICATION

There is disclosed in a pending application Ser. No. 37,514, filed May 15, 1970, and now abandoned in the names of Austin G. Fuller et al a machine for dealing out pieces of fabric from a jumbled pile.

BACKGROUND OF THE INVENTION

This invention is concerned with automatic mechanism for transferring successive flexible work pieces from one position to another. More particularly the invention relates to providing means for separating individual pieces of fabric or the like from a jumbled pile in order that they may thereafter by individually further processed either manually or by machinery.

At different steps of manufacture or treatment such items as sheet-like articles, garment pieces, or laundry may need to be extricated from an accumulation in order thereafter to receive further attention one at a time. It is recognized as a laborious and tedious chore manually to separate flexible pieces singly from a pile since they often vary greatly in size, shape, surface texture, degree of entanglement, wetness, etc. There is a probability in a mechanized system that should more than one piece be segregated and fed at one time, none would receive appropriate handling at a subsequent station, an incorrect count may be obtained, and damage may be done to the work pieces.

The Fuller et al approach referred to above is a conveyorized arrangement employing a pointed means for controlling the rate of feed-out of pieces from a jumbled pile, whereas the present invention is especially adapted to cyclically pick up a single piece from a pile and then release it in a predetermined position for further processing. Thus, for example, the present invention is well adapted for use with a laundry counting means, and may be more versatile in delivering work pieces to different associated production equipment. It may also be noted that utilizing a pointed means, such as card cloth, often involves problems in insuring release of the material transferred at the exact point and desired instant.

U.S. Letters Pat. No. 3,092,263 and 3,092,271 represent earlier relatively complicated attempts to deal with singulating flexible sheets found in random array. No presently known inexpensive device is believed to be commercially available for the purpose.

SUMMARY OF THE INVENTION

In view of the foregoing it is an object of this invention to provide an improved mechanism for removing successive work pieces of sheet material from a random pile and transferring them one by one to a predetermined position.

It is another and more specific object of the invention to provide a reliable, relatively simple work transferring means employing fluid pressure operated work clamping jaws, and a sensing device responsive to presentation of a work piece adjacent to or between the jaws for effecting their closure.

With these objects in view, and in accordance with a feature of the invention, the illustrative work transfer means comprises a suctional work-engaging member movable cyclically heightwise and laterally of a jumbled pile of work pieces to be fed singly to a predetermined release position, the member having an open, work clamping end and a relatively closable work clamping jaw, and a circuit for controlling the jaw, which circuit includes a fluid pressure sensor for closing the jaw in response to reception of a portion of the work piece to be transferred in restrictive or blocking relation to the opening of the work clamping end.

In accordance with a further feature of the invention there is interposed in the retractive path of the work clamping member a restraining member preferably in the form of a radially slit diaphragm adapted to comb out the work piece to be transferred and to strip off any unwanted second work piece which may have been partially clamped or entangled.

BRIEF DESCRIPTION OF THE DRAWINGS

The foregoing and other features of the invention will now be more particularly described in connection with an illustrative embodiment and with reference to the accompanying drawings thereof, in which.

DESCRIPTION OF THE PREFERRED EMBODIMENT

Figure 1:
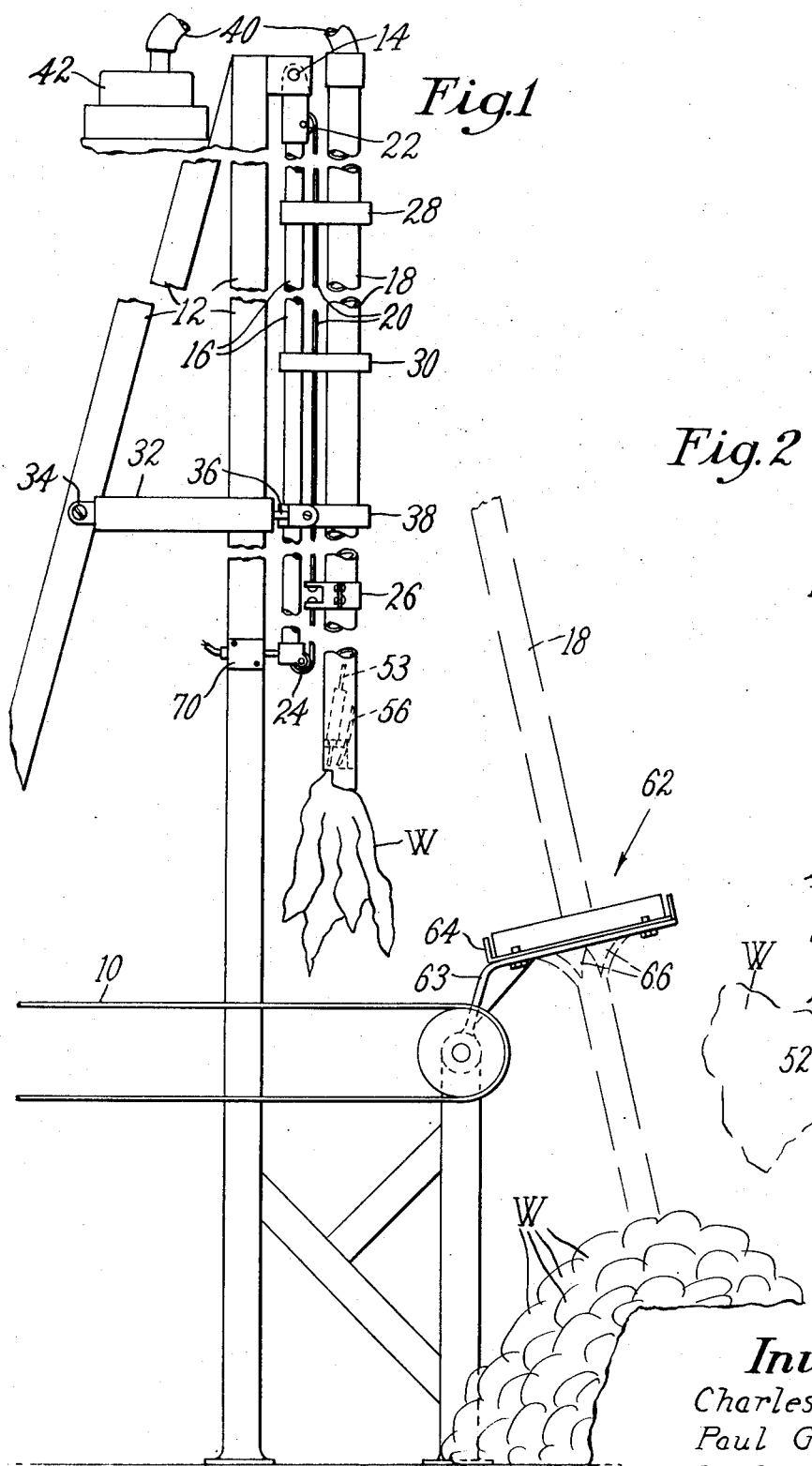
FIG. 1 is a view in side elevation of a machine for removing and transferring successive flexible work pieces from a random pile.

In FIG. 1 a random pile of work pieces W is to be transferred one-by-one to a predetermined position, such as onto a conveyor 10, for further individual processing, counting, or treatment. Each piece W may be of the same size, shape and material, or they may widely differ in these and other respects. They are often accumulated in random work piles wherein each piece may, for instance, be flimsy and of uniform characteristics while other piles may consist of heavy, wet, and differently shaped pieces as dealt with in laundries. The machine to be described effects transfer of the pieces singly and normally without the risk of damage to them.

An A-shaped frame 12 supports on a horizontal pivot pin 14 a depending air cylinder 16 having a dual acting piston (not shown) reciprocable therein for controlling heightwise movements of a suctional work transferring member 18 as will be explained. The piston is connected to adjacent ends of a wire 20 arranged in a loop to extend about upper and lower pulleys 22, 24 respectively journaled in the cylinder 16 and having other adjacent ends connected to a bracket 26 clamped on the member 18. One or the other of the opposite sides of the piston is alternately connected to a source of air under pressure to move the piston up or down and thereby acts through the wire 20 to move the member 18 down or up, the member 18 passing through guide bearing brackets 28, 30 affixed to the cylinder 16.

For moving the work transferring member 18 laterally of the pile of work pieces W and into a vertical position above the conveyor 10, an air cylinder 32 (FIG. 1) has an end secured to the A-frame at 34 and a piston rod 36 secured to a guide bracket 38 axially receiving the member 18. The cylinder 32 is connected to a source of air pressure for cyclically swinging the member 18 at appropriate times between its delivery or work releasing position shown in full lines in FIG. 1 and an angularly related pick-up position shown therein in dashed lines.

Figure 2:
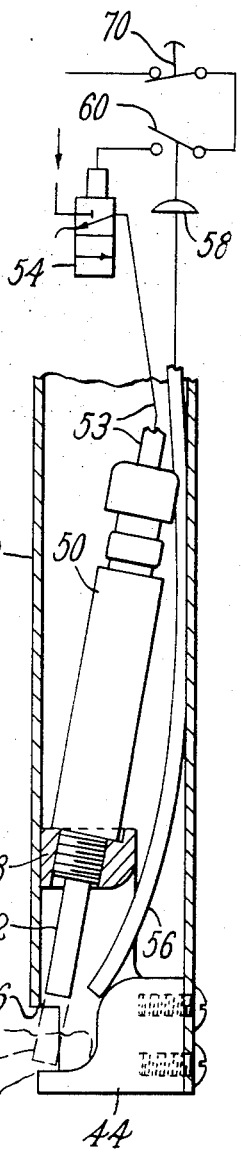
FIG. 2 is an enlarged vertical section of a fluid pressure operated work clamping mechanism shown in FIG. 1, together with its schematic control circuit.

An upper end of the member 18, which is tubular, is connected by a hose 40 to a suitable source of vacuum such as a pump unit 42 secured to the frame 12. The lower end of the member 18 is partly closed by a plug or fixed jaw member 44 (FIG. 2) secured therein to provide an opening 46. Threaded into an internal support block 48 (FIG. 2) mounted in the lower end of the member 18 is an air cylinder 50 having a piston rod 52 arranged as a relatively movable clamping jaw for cooperation with the fixed jaw 44. As indicated in FIG. 2 the cylinder 50 is connected by a tube 53 to a two-way valve 54 actuatable as will hereinafter be described. The opening 46 is restricted sufficiently to make unlikely the simultaneous accessibility of more than one piece W between the jaws 44, 52.

For controlling closure of the jaws 52, 44 on a work piece W in response to its blockage or restriction of the opening 46 upon the member 18 being thrust by the power means 16, 20 into the random pile of pieces, a sensor in the form of a tube 56 is provided in the member 18 and has one end arranged adjacent to the opening 46. The tube 56 is connected at its upper end to a diaphragm 58 of a switch 60 electrically controlling the valve 54. It will accordingly be understood that the vacuum in the member 18 need only be sufficient to exert an attraction toward the opening 46 for a small portion of the work piece W to be transferred, and when the small portion restricts the opening 46 there is a reduction in air pressure communicated to the member 18 and to the tube 56. Accordingly the diaphragm 58 is actuated to close the switch 60. As a consequence the valve 54 is shifted and air under pressure is directed to the cylinder 50 whereby the movable jaw 52 is at once caused to clamp the work piece portion on the fixed jaw 44.

With the work piece clamped as just described, air under pressure is admitted to the cylinder 66 to cause the upward axial retraction of the member 18. Accordingly a clamped work piece W is drawn upwardly through an optional stripping device generally designated 62 (FIG. 1) which is shown mounted on one end of the conveyor 10. The device 62 includes a bracket 63 and an annular ring 64 for clamping thereon a diaphragm 66, preferably of urethane, which has been slit radially to provide tongues for stripping off any secondary work pieces which may be clinging to the member 18 or the clamped work piece W. The diaphragm 66 also serves to comb out the piece W as it is lifted.

On reaching its limit of upward movement the member 18 is swung back to its full line or vertical work releasing position by the cylinder 32, a spring return switch 70 on the frame 12 being actuated to reverse the valve 54 to its exhaust position whereupon the piston rod jaw 52 opens to allow the work piece W to be deposited on the conveyor 10. With pressure now restored in the tube 56 the sensor switch 60 reopens and the operating cycle may be repeated.

Having thus described our invention, what we claim as new and desire to secure by Letters Patent of the United States is:

1. A machine for transferring flexible work pieces singly from a pile comprising a suctional work-engaging member movable relative to the pile, means for moving the member between a work-engaging position and a delivery position, the member having an opening adapted to be restricted by a portion of a work piece and provided with work clamping mechanism operable within the opening, and a circuit for controlling said clamping mechanism and including a sensing means responsive to the restriction of the opening for closing the clamping mechanism.

2. A machine as set forth in claim 1 wherein the opening in the suctional member is at an end thereof, and the work clamping mechanism comprises a pair of relatively movable jaws one of which defines at least a part of the opening.

3. A machine as set forth in claim 1 wherein fluid pressure actuated means is provided for operating the work clamping mechanism, the control circuit includes a valve interconnecting a source of air under pressure with the fluid pressure actuated means, and the circuit further comprises electric means including a switch for shifting the valve, and a fluidic sensor for actuating the switch.

4. A machine as set forth in claim 3 wherein the fluidic sensor is a tube having one end adjacent to the opening and its other end connected to a diaphragm for shifting the switch.

5. A machine as set forth in claim 1 wherein a stripping and combing means is disposed in the path of the member for removing therefrom a work piece not firmly clamped by the clamping mechanism.

6. A machine as set forth in claim 5 wherein the stripping means is in the form of a flexible urethane diaphragm, slit to provide a passageway for the suctional member.

7. In a machine for transferring successive flexible work pieces from a pick-up position to a delivery position, a movable tubular member having an inlet adjacent to one end thereof, power means for cyclically moving the member between the pick-up and delivery position, means for drawing a partial vacuum in the member to attract a portion of the work piece into the inlet at the pick-up position, relatively movable work clamping jaws mounted adjacent to said inlet, mechanism for actuating the jaws, and a sensor mounted on the member and responsive to change of pressure therein upon restriction of the inlet by a work piece portion, said sensor being operative to effect closure of the jaws on said work piece.

8. A machine as set forth in claim 7, one of the work clamping jaws being stationary to define at least a part of said inlet, and a cooperative clamping jaw constituting the piston of a fluid pressure operated cylinder device.

* * * * *